(12) United States Patent
Temple

(10) Patent No.: US 10,095,316 B2
(45) Date of Patent: *Oct. 9, 2018

(54) SCROLLING AND ZOOMING OF A PORTABLE DEVICE DISPLAY WITH DEVICE MOTION

(71) Applicant: Will John Temple, Placerville, CA (US)

(72) Inventor: Will John Temple, Placerville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/330,589

(22) Filed: Oct. 17, 2016

(65) Prior Publication Data

US 2017/0068325 A1  Mar. 9, 2017

Related U.S. Application Data

(62) Division of application No. 12/590,413, filed on Nov. 5, 2009, now Pat. No. 9,696,809.

(51) Int. Cl.
| | |
|---|---|
| *G06F 3/01* | (2006.01) |
| *G06F 3/0346* | (2013.01) |
| *G06F 3/0485* | (2013.01) |
| *G09G 5/34* | (2006.01) |

(52) U.S. Cl.
CPC ............ *G06F 3/017* (2013.01); *G06F 3/0346* (2013.01); *G06F 3/0485* (2013.01); *G09G 5/34* (2013.01); *G06F 2200/1637* (2013.01); *G06F 2203/04806* (2013.01); *G09G 5/346* (2013.01); *G09G 2340/045* (2013.01); *G09G 2340/0407* (2013.01); *G09G 2354/00* (2013.01); *H04M 2250/12* (2013.01)

(58) Field of Classification Search
CPC ........................................................ G06F 3/017
USPC ........................................................ 345/660
See application file for complete search history.

(56) References Cited

U.S. PATENT DOCUMENTS

| | | | | |
|---|---|---|---|---|
| 6,330,009 | B1* | 12/2001 | Murasaki | G06F 3/0485 345/684 |
| 6,567,101 | B1* | 5/2003 | Thomas | G06F 1/1626 345/649 |
| 2008/0122796 | A1* | 5/2008 | Jobs | G06F 3/0488 345/173 |
| 2009/0303204 | A1* | 12/2009 | Nasiri | A63F 13/06 345/184 |

(Continued)

*Primary Examiner* — Jason C Olson

(57) ABSTRACT

A portable computing device (10) with a display screen (26) that may be scrolled and/or zoomed in response to changes in the spatial orientation of the computing device. Changes in the spatial orientation of the computing device are sensed by accelerometers (20) contained in the device. Software converts signals sent by the accelerometers to scrolling or zooming commands that scroll and/or zoom the display screen. Motion of the computing device in the plane of the display screen of the computing device results in scrolling the display screen in the opposing direction of the motion of the computing device a distance greater than the distance the computing device is moved. Motion of the computing device perpendicular to the plane of the display screen zooms the display screen in or out. Motion of the computing device toward the user results in the display screen being zoomed in to reveal greater detail. Motion of the computing device away from the user results in the display screen being zoomed out to reveal more content.

20 Claims, 7 Drawing Sheets

(56) References Cited

U.S. PATENT DOCUMENTS

2010/0188432 A1* 7/2010 Tsai ................. G06F 3/017
  345/684
2012/0274663 A1* 11/2012 Laine ................ G06F 1/1626
  345/659

* cited by examiner

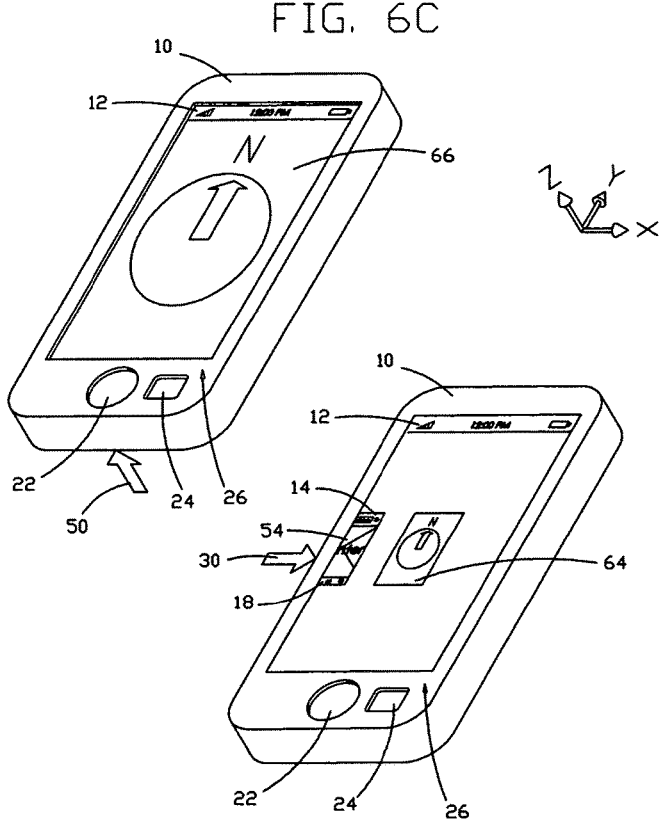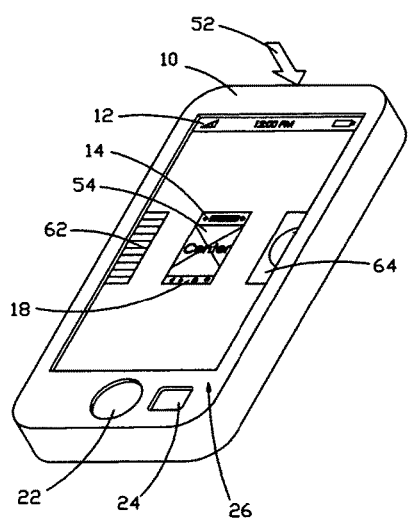

SCROLLING AND ZOOMING OF A PORTABLE DEVICE DISPLAY WITH DEVICE MOTION

CROSS-REFERENCE TO RELATED APPLICATIONS

This application is a division of U.S. patent application Ser. No. 12/590,413, filed 2009 Nov. 5.

BACKGROUND

Field of Invention

The disclosed embodiments relate generally to portable computing devices and mobile electronic devices with display screens, and more particularly, to portable computing devices and mobile electronic devices that interpret user motions of the device to scroll and zoom a display screen.

Description of Prior Art

As portable computing devices become smaller, the size of their display screens have become smaller. A small display screen, one that is much smaller than a desktop or laptop computer's display screen, presents a significant challenge to provide a user interface that allows users to easily interact with a computing device without interfering with the displayed content of the device. The user interface not only allows users to view content, but a user interface is required to allow the user to view the extents of all the content that the device is capable of providing. Some portable computing devices have resorted to adding finger gestures to replace common user interface objects, such as scroll bars and zoom sliders. Finger gestures represent an improvement as finger gestures usually do not place objects on the display screen and they are simple to use. But finger gestures also suffer from the following undesirable effects: Two hands are generally required to scroll. One hand is used to hold the device while fingers on the other hand are used to scroll and/or zoom the screen. Also, the user's fingers are in the way of viewing the display screen during the time the scroll and/or zoom commands are executed. This results in a two step process. First the user performs the hand gestures to scroll or zoom the display screen. Then the user may see the changes to the display screen without the user's fingers in the way.

The conventional user interface for scrolling is scroll bars. These scroll bars require screen real estate and limit the amount of content that can be viewed on the display screen. Using a scroll bar on a small portable communications device requires precision input as the scroll bars are very small and errors are common. Scroll bars, as with finger gestures, require the user's fingers, or a stylus, to be on the screen which may interfere with viewing of the screen display. Using both scroll bars, with the user's fingers, and finger gestures require the touching of the screen which can smear the screen with contaminants from the hands.

To avoid problems associated with finger gestures and scroll bars, portable computing devices may use screen displays with an accelerometer that detects user motions on the screen and translate detected motions into scrolling or zooming commands to be performed by the visible program.

Image shifting of the display screen has been previously implemented in portable devices. A common device to include this capability is digital cameras. Digital cameras shift images on their display screens to stabilize pictures. However, shifting an image on screen does not move significant off screen display content on to the display screen, as does scrolling. Scrolling, through user motion, enables the user of a portable device to view previously unseen screen content with user intended device motion.

Accordingly, there is a need for portable computing devices with a more transparent and intuitive user interface for viewing content beyond the physical limits of the display screen. Such an interface will increase the effectiveness, efficiency and user satisfaction with portable computing devices.

BRIEF DESCRIPTION OF THE DRAWINGS

For a better understanding of the embodiments of the invention, as well as additional embodiments thereof, reference should be made to the Description of Embodiments below, in conjunction with the following drawings, in which like reference numerals refer to corresponding parts throughout the figures.

FIG. 6A illustrates a portable computing device with display screen in accordance with some embodiments, after being moved away from the user.

FIG. 6B illustrates a portable computing device with display screen in accordance with some embodiments, after being moved to the right.

FIG. 6C illustrates a portable computing device with display screen in accordance with some embodiments, after being moved towards the user.

REFERENCE NUMERALS IN DRAWINGS

Figure 1:
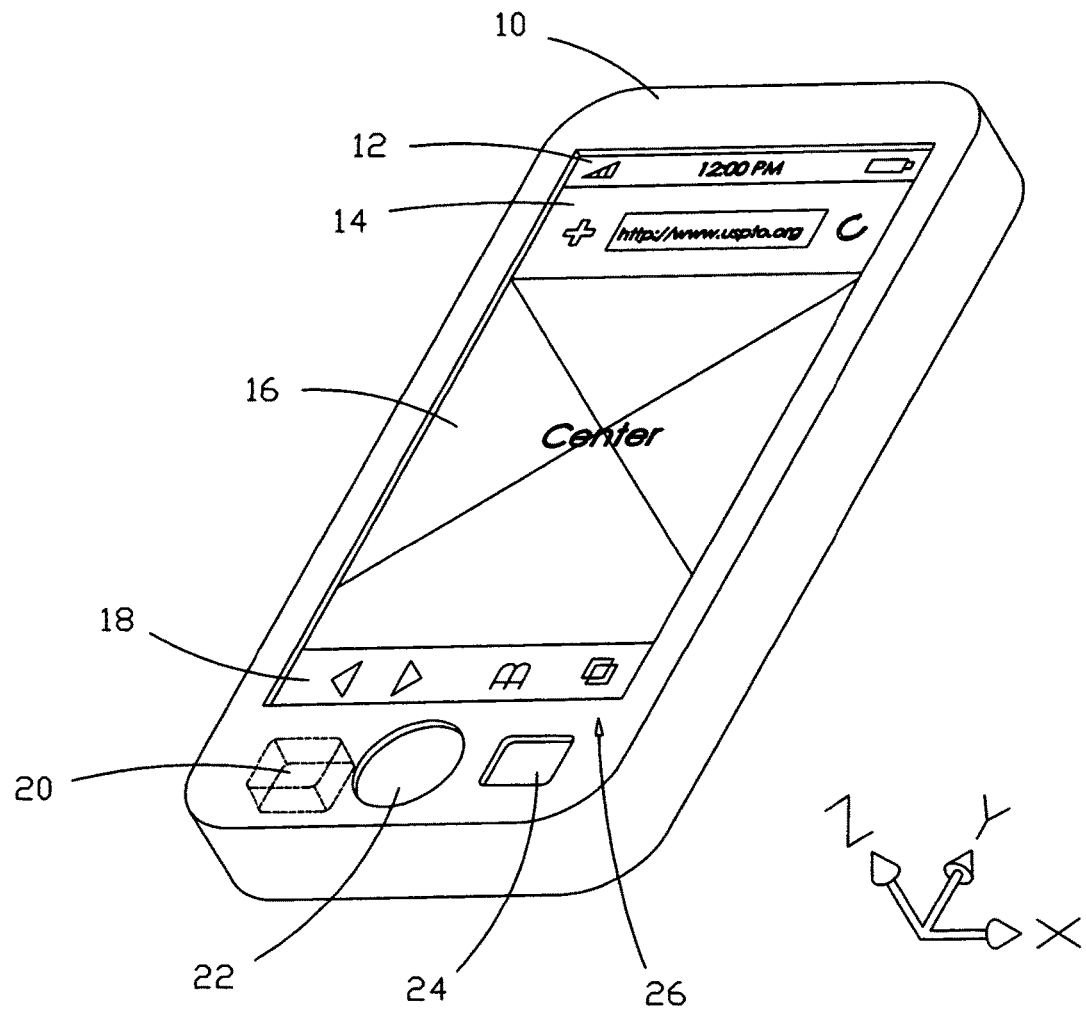
FIG. 1 illustrates a portable computing device with display screen in accordance with some embodiments.

10 Computing Device (Including, processors, memory, programs, clock, instructions, gyroscope, speaker, tactile feedback.)
12 Status Bar
14 Address Bar
16 Scrollable and/or Zoomable Portions of the Display
18 Control Bar
20 Accelerometer
21 Accelerometer
22 Home Button
24 Motion Control Button
26 Display Screen
28 Visible Program's Content 30 Motion Arrow
32 Motion Arrow
34 New Device Position
35 New Rotated Device Position
36 Initial Device Position
38 Border
40 Visible Program's Entire Content
50 Motion Arrow
52 Motion Arrow
54 Visible Program's Content
56 Visible Program's Content
60 Motion Arrows
62 Second Program's Content
64 Third Program's Content
66 Third Program's Expanded Content
70 Scrollable Portion of the Display
72 Scrollable Portion of the Display
74 Motion Arrow

DETAILED DESCRIPTION OF THE EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known and/or common processes, programming methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms may only be used to distinguish one element from another. For example, a first motion could be termed a second motion, and, similarly, a second motion could be termed a first motion, without departing from the scope of the present invention.

The terminology, used in the description of the invention herein, is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or", as used herein, refers to and encompasses any and all possible combinations of one or more of the associated listed items. It will be further understood that the terms "comprises" and/or "comprising," when used in this specification, specify the presence of stated features, steps, methods, operations, elements, and/or components, but do not preclude the presence or addition of one or more other features, steps, methods, operations, elements, and/or components thereof.

Embodiments of a portable computing device, a scrolling and zooming user interface for such devices, and associated processes for using such devices are described. In some embodiments, the device is a portable communications device such as a mobile telephone that may also contain other functions, such as Web browsing, PDA, music player, and other functions as well as downloadable applications for unlimited functionality.

For simplicity, in the discussion that follows, a portable computing device is used as an exemplary embodiment. It should be understood, however, that some of the motion controlled user interfaces and associated processes may be applied to other devices, such as, but not limited to, portable projection devices, hand held electronic displays, personal computers, laptop computers, tablet computers, portable music players, GPS units, and digital cameras and camcorders during playback and/or menu modes, which may include accelerometers. The portable computing device may be capable of performing a plurality of tasks and are sometimes referred to as a multifunction device. For simplicity the portable computing device is sometimes simply referred to as "the computing device" or as "the device".

In the examples about to be disclosed, the portable computing device is based on a popular computing phone that contains one button: a home button 22. The home button is a button that if pressed and released issues a home command to the device to display the home screen of the device. For the purposes of this disclosure, the home button represents any button that has an associated command, not related to scrolling and/or zooming, that is executed upon the press and release of the button. In the example device illustrated in the figures of this disclosure, a second button has been added to the device. This is a motion control button 24 and the button represents any button whose function is dedicated to scrolling and/or zooming commands. For simplicity, the term 'button' will represent any known physical means to issue a user command to the device.

For simplicity, the one or more currently running programs that display content to the user and are visible to the user of the portable computing device will be referred to as the visible programs.

A portable computing device may have one or more screens for the display of user viewable program content. The screens may be, but not limited to, side by side screens or screens on different sides of the device. For simplicity, the one or more screens currently viewable by the user may be referred to as the "display screens" or as the "display screen".

Common to all embodiments is means to sense motion of one or more display screens that are viewable by the user, with means to scroll and/or zoom those display screens. The processing of the motion sensing signals and the means and methods to translate those signals into screen changes need not occur in the portable device that houses the display screen. For example: accelerometer signals and the processing of the signals may be communicated to a processor outside of the portable device and the programming of the display may, likewise, be communicated from an outside processor. In the example portable device described herein, all means to sense motion of the viewable display screens and to translate those signals into screen changes are contained in the one portable device. However, the term "portable computing device" should be construed to comprise: one or more portable display screens, the means to sense motion of one or more portable display screens, and the means to translate the motion signals of the one or more viewable display screens into screen changes, wherever the processing of the motion signals may take place.

In the preferred embodiment, the means to sense motion of one or more display screens of the computing device comprises one or more 3-axis accelerometers. An accelerometer is any device that that can measure the acceleration of the portable computing device in a direction. The accelerometer may measure the force of gravity. A 3-axis accelerometer has three separate accelerometers with acceleration sensing means for the three directions X, Y, and Z that are required to define three dimensional space. Measurements in the three directions, X, Y, and Z, may be positive or negative values representing motion in the positive or negative axial directions, respectively. For simplicity, the three directions, X, Y, and Z refer to either positive or negative directions. For simplicity, the term accelerometer may refer to a single accelerometer measuring acceleration in one direction or may refer to a 3-axis accelerometer depending on context.

In all figures that display an X, Y, Z axis legend, the X and Y axis's define a plane in the plane of the display screen 26 of the portable computing device 10. The Z axis is defined as perpendicular to the display screen and the positive Z direction extends upwards from the display. For simplicity, it is assumed that the positive Z direction points toward the user of the device, which assumes that the user's commands initialized the motion values while the user was facing the display screen.

In an aspect of the invention, the velocity and/or displacement, as well the acceleration, of the portable computing device need to be known in some embodiments and methods. The values for velocity and displacement may be calculated from acceleration signals from an accelerometer. Displacement is the distance the portable computing device is moved relative to the user assuming that the user remains at a constant velocity, relative to the Earth, of course. To find device displacement, initial displacement and initial velocity must be established to calculate displacement from acceleration values. In the preferred embodiment, the processes that interpret acceleration signals sets the initial displacement and initial velocity values for the three directions X, Y, and Z to zero upon startup, wakeup, and/or in response to a command or message to initialize values, and/or the detection of a change of the device orientation. The processes that interpret acceleration signals also saves the initial acceleration values for the three directions X, Y, and Z. Due to gravity, the initial acceleration values may not be zero. Because acceleration is the second derivative of displacement, the following formula is used to find displacement in one of the X, Y, or Z directions: $d=d_o+v_o t+\frac{1}{2}(a-a_o)t^2$ where d is displacement, $d_o$ is the last displacement, $v_o$ is the last velocity, a is the acceleration, $a_o$ is the initial acceleration, and t is the time interval between the current acceleration signal and the last signal. In the preferred embodiment, the process that interprets acceleration signals receives signals from the accelerometer at a set sampling rate. However, due to device operating and processor priorities, the process is not guaranteed to receive acceleration signals at exact intervals of time. The process needs to keep track of the following data variables: last displacement, last velocity, and the last time the acceleration signal was received for all three directions: X, Y, and Z. From these data variables, a current acceleration signal, and the initial acceleration values, the current device velocity and displacement may be calculated. The current velocity value v is the first integral of acceleration and is calculated with the equation $v=v_o+at$ where $v_o$ is the last velocity value. The data variable $v_o$ is then set to v and the data variable $d_o$ is then set to the value of d, as returned from the first equation. The equations of motion and their application to accelerometers are well known. The methods to detect device motion from accelerations are common. Acceleration signals may be referred to as motion signals.

Attention is now directed towards embodiments of the device.

In the preferred embodiment, the device can support scrolling and/or zooming through motion of the device for any application programs running on the device that scrolls and/or zooms their content. A web browsing application will be used as an example program.

Scrolling is the process of moving viewable program content that is currently off screen on to the display screen. Some of the previously viewable display screen content is concurrently moved off screen. Scrolling is similar to shifting displayable content for screen stabilization, as seen in video and still cameras. However, scrolling differs from shifting displayable content by moving a significant amount of new, previously un-viewable off screen content on to the display screen. Scrolling also differs from shifting as scrolling is an intended user command. In the preferred embodiment, screen scrolling is smooth. In another embodiment, the scrolling may occur with distinct blocks of content entering and leaving the viewable display screen area.

If the entire screen contents are scrolled and/or zoomed, this is sometimes referred to as a virtual screen. A virtual screen is well known in the art and makes it possible to scroll and/or zoom around, and/or in and out of, a view that is larger than the display screen is capable of displaying. In an embodiment, the running programs write to a display buffer that is larger than the actual display screen. In response to user motion of the portable computing device, a process interprets signals from the accelerometer and then changes which part of the display buffer is written to the actual display screen. This process is generally fast and results in fast screen updates. However, in this embodiment, the extents of the display buffer may be scrolled and/or zoomed, but the entire extents of the visible contents of the visible programs may not be scrolled and/or zoomed. Also, portions of the screen that contain elements that the user would desire to remain stationary, such as, but not limited to, a status bar, an address bar, a control bar, and other screen objects may be scrolled and/or zoomed off the display screen.

In the preferred embodiment, a process interprets signals from the accelerometers and outputs scrolling and/or zooming commands, or messages to the visible programs. An application programming interface (API) is supplied. The API provides a set of commands or messages to the one or more visible programs to control the scrolling and/or zooming of portions of the display screen. In this embodiment, the visible programs need not know whether motion, gesture, or other means generated the commands. Existing software programs need not be modified. The visible programs then scroll and/or zoom only appropriate portions of their visible content. Screen objects, such as menus, status bars, rulers, ribbons, executable touch screen buttons and other objects, may remain on screen and visible and stationary relative to the portable computing device. The portions of a display screen that contains scrollable and/or zoomable content may encompass the entire display screen.

In another embodiment, the one or more visible programs receive accelerometer signals directly and translate the signals into scrolling and/or zooming of portions of the display screen.

Software means to receive and interpret hardware based signals, such as from an accelerometer, are well know. The heuristics and methods implemented in processes and programs to receive and translate hardware based signals may occur at the application programming level, the operating system level, or at another software level. The device of this invention should not be limited by the multitude of known means of receiving and interpreting hardware based signals and methods of translating the signals into program commands.

In the preferred embodiment, an accelerometer generates common signals at a set sampling rate to be interpreted by a process, first to accelerations and/or displacements and/or velocities of the device, and second from accelerations and/or displacements and/or velocities to scrolling and/or zooming commands or messages to the one or more visible programs.

FIG. 1 is perspective view illustrating a portable computing device 10 with a display screen 26 in accordance with some embodiments. The display screen may be a touch sensitive screen called a "touch screen" for convenience. The device 10 includes the following common elements: one or more processors, one or more accelerometers 20, one or more display screens, memory, and may include, but not limited to, a memory controller, audio circuitry, a speaker, a vibrator for tactile feedback, a microphone, an input/output (I/O) subsystem, clock, other input or control devices, and external ports. The display screen facilitates scrolling and/or zooming of the scrollable and/or zoomable portions of the display 16 while the user is moving the device.

Figure 2:
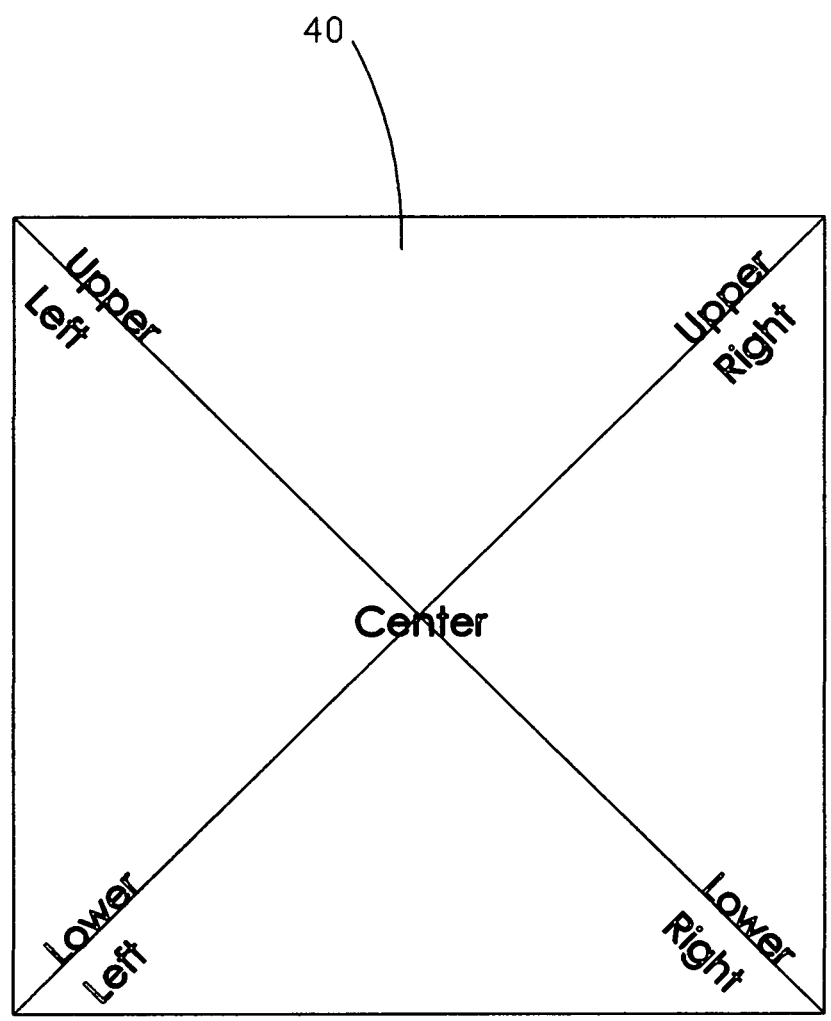
FIG. 2 illustrates an example of a programs entire screen content.

FIG. 2 shows the entire extents of the displayable content 40 of an example program. The example program illustrated is a web browser and the extents of displayable content represent a single web page. This example web page consists of clearly marked orientation markers that help the reader to see how the device changes the displayable content in response to movement, as illustrated in FIGS. 3, 4A, 4B, 5, 6A, 6B, 6C, 7A, 7B, and 7C.

The displayable content need not have limits. An example would be a program that displays a map of the Earth. A map of the Earth could be scrolled in any direction indefinitely.

Figure 3:
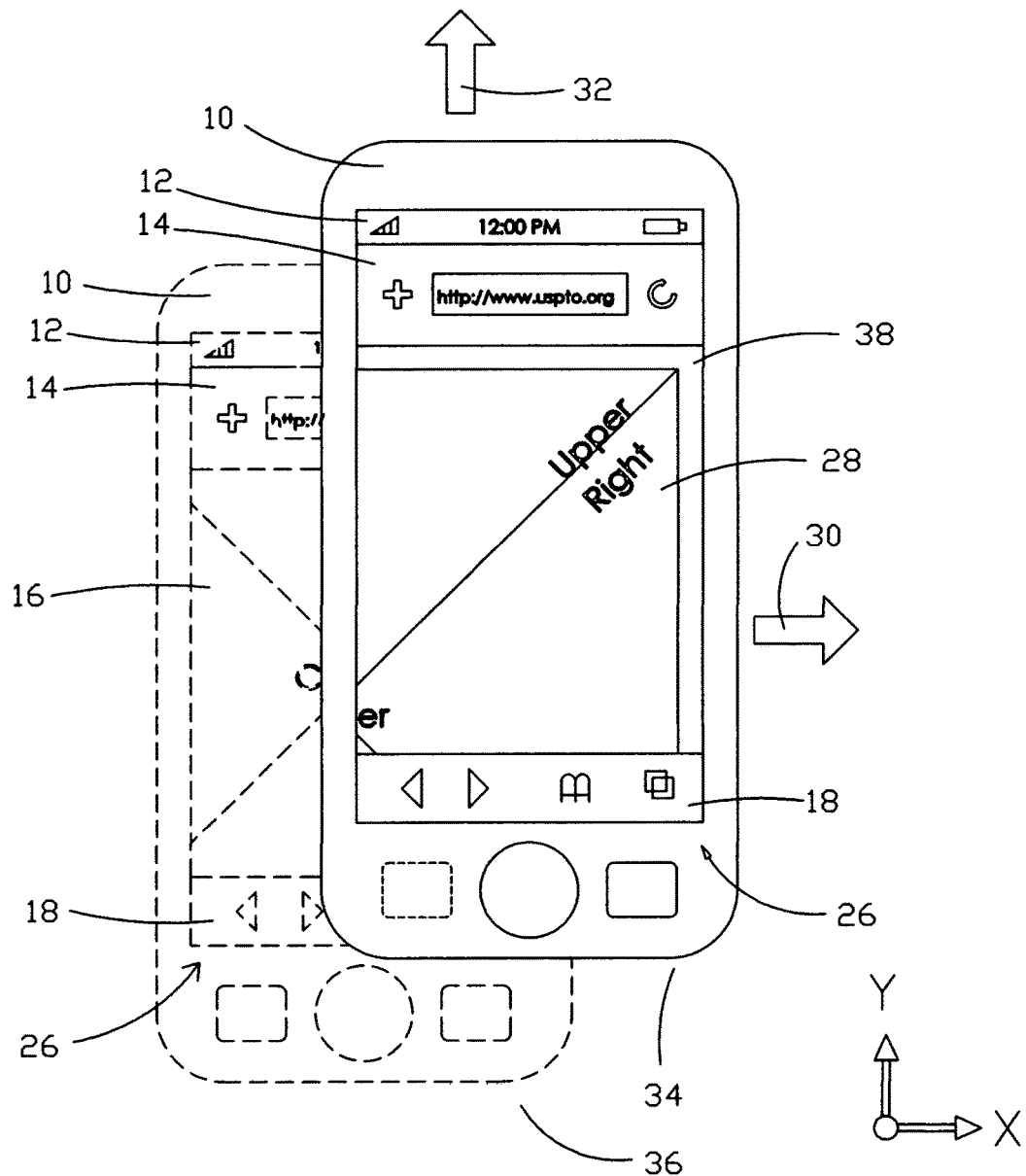
FIG. 3 illustrates the portable computing device with display screen, in accordance with some embodiments, after being moved up and to the right.

FIG. 3 illustrates some embodiments of the computing device 10 that scroll portions of the display screen 26 in response to motion of the device. As illustrated in FIG. 3, the device has been moved to the right in the positive X direction, as generally indicated by motion arrow 30, and the device has been concurrently moved up in the positive Y direction, as generally indicated by motion arrow 32, from an initial device position 36 to a new device position 34. In the initial position, the visible program's content appears as it appears in FIG. 1. The reader can see that the scrollable portion of the visible program's content 28, in the new device position, has been scrolled on the device to the left in the negative X direction, and down in the negative Y direction, relative to the program's content that was displayed in the initial position. Whereby, the user of the device may easily and quickly view the extents of the scrollable contents of the visible program through simply moving the device.

In FIG. 3, the device has been moved to the right and upward concurrently, however, the present technique may be applied to any combination of device movements, or no movement, in both the in display plane, X and Y, directions. Device motion in the Z direction is ignored for the purposes of scrolling the display screen.

In the preferred embodiment, as illustrated in FIG. 3, a portion of the display screen 16 is scrolled in the opposite direction of device movement in the X and/or Y directions, and by an amount of displacement greater than the displacement of the device. In other words, the scrolling of the display screen corresponds with the opposite direction of device movement. While this does not provide for a completely stabilized screen relative to the user, as would scrolling the display screen an equal displacement to the displacement of the device, it limits the displacement of the device needed to view the entire viewable and scrollable content. In FIG. 3, the reader can see that the scrollable portion of the visible program's content 28, in the new device position 34, has been scrolled on the device to the left in the negative X direction, and down in the negative Y direction, relative to the program's content that was displayed in the initial device position and by greater displacements than the device has been displaced in the two directions.

In the preferred embodiment, the ratio of screen scrolling displacement to device motion is scalable based upon the current device velocity.

In another embodiment, the ratio of screen scrolling displacement to device motion is scalable based upon the current device acceleration.

In another embodiment, the ratio of screen scrolling displacement to device motion is scalable based upon the current device displacement.

In another embodiment, the ratio of screen scrolling displacement to device motion is scalable based on the size of the visible program's content.

In an aspect of the invention, the ratio of screen scrolling displacement to device motion may be based on any combination of previously stated device motion values and the size of the visible program's content. The scaling values may be user configurable or hard coded into the device or individual programs.

When the user of a portable computing device uses motion to scroll, the program content that is scrolled moves relative to the user at a slower rate than the device moves. That is, until the limits of the scrollable program content are reached. When the limits of the content are reached, the program may stop scrolling the content, which will suddenly cause the rate of motion of the content to change to the rate of motion of the device, whereby the content will suddenly appear to jump, as viewed by the user. Or the program may reduce the rate of scrolling in anticipation of the limits of scrolling being reached with user motion. Or the program may over-scroll. Over-scrolling is the ability of the visible program to scroll past the limits of its viewable content by displaying a border of limited width.

FIG. 3 illustrates an embodiment of the invention that allows over-scrolling. In FIG. 3, the device 10 has been moved by the user to a new device position 34. In the new device position, the visible program has scrolled its content 28 past its upper right limits in both the X and Y directions. The viewable program displays border 38.

In the preferred embodiment, the visible program may over-scroll. The visible program, upon exceeding the limits of scrolling, will begin to display a border, which may be, but not limited to, a graphic such as a color. The visible program will decrease the ratio of scrolling displayable content to device motion as a ratio of the width of the border currently displayed to the maximum width of the border. The maximum width of the border may be user configurable or may be hard coded into the programs or device. Likewise, the color and pattern of the border may be user configurable or hard coded into the programs or the device. If the device motion is slowed past a threshold value, the visible program will realign the visible program's display content by scrolling the visible content in the direction of the border at a set rate until the border has disappeared. That set rate may likewise be user configurable or hard coded into the programs or the device. The ability of the visible program to scroll past the visible content keeps the visible content from suddenly appearing to jump, when the limits of scrollable content are reached, as viewed by the user of the device.

In an embodiment, the visible program may reduce the rate of scrolling in anticipation of the limits of scrolling being reached with user motion. A method that controls scrolling and is implemented by a process or program comprises: detecting the current rate of motion, calculating a time to reach the limits of scrollable content at the current rate of motion, determining a command to change the rate of scrolling if the calculated time is within a threshold value or scaling the rate of scrolling based upon the time value, and executing the command, whereby, the scrollable content of the visible program does not appear to the user to suddenly jump by an abrupt change of the rate of scrolling.

In an embodiment, the computing device emits an auditory warning that the limits of scrolling are about to be reached. The condition that the limits of scrolling are about to be reached is calculated from the following values: the current velocity of the device, in the direction being scrolled, and the distance to the limits of the displayable content. From this data, an auditory warning, which may consist of, but not limited to, a simple noise emitted from a speaker in the device will occur when the device calculates that the scrolling of content will reach its limits within in a set time. This set time may be user configurable or may be hard coded into the programs or device. Likewise, the device may emit a tactile feedback, or haptic feedback, warning that the limits of scrolling are about to be reached. The feedback may be, but not limited to, a vibration. The device may emit auditory and/or tactile feedback warnings that the limits of scrolling are about to be reached.

In another embodiment, the computing device emits an auditory and/or tactile feedback warning that the limits of scrolling have been reached.

In the preferred embodiment, scrolling of a portion of the screen may occur in either positive or negative X or Y directions. While the processing of X and Y accelerometer values may not occur simultaneously, the scrolling of the display screen will appear to the user to move in both the X and Y directions concurrently and seamlessly. The rates of scrolling in each of the X and Y directions are independent of each other. Likewise, in the preferred embodiment the amount and rates of over-scrolling are independent and may occur in either positive or negative X or Y direction directions concurrently and seamlessly.

Figures 4A, 4B:
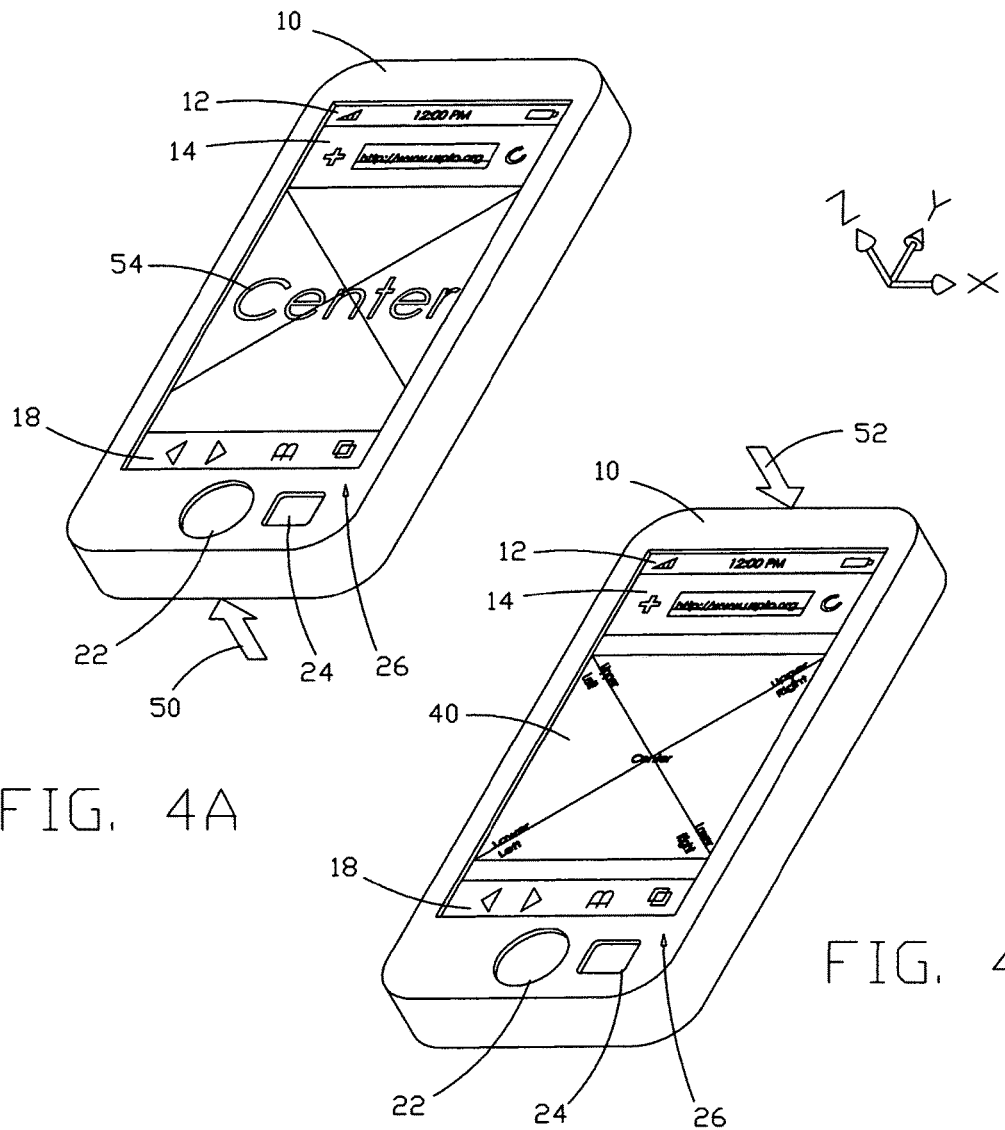
FIG. 4A illustrates the portable computing device with display screen, in accordance with some embodiments, after being moved toward the user.
FIG. 4B illustrates the portable computing device with display screen, in accordance with some embodiments, after being moved away from the user.

In the preferred embodiment, motion of the portable computing device in the Z direction is processed to zoom into or out of the displayable content of the visible programs. FIG. 4A shows the portable device 10 having been moved by the user in the positive Z direction as indicated by motion arrow 50. The positive Z direction is defined to be the direction perpendicular to the plane of the display screen 26 and upwards from the display screen. This direction will be towards the device user who is viewing the display screen if the display screen was facing the user when the motion variables were initialized. The screen is zoomed-in in response to motion in the positive Z direction, as viewed in FIG. 4A. In other words, the visible program's content in the scrollable and/or zoomable portions of the display 16, as seen prior to device movement in FIG. 1, has been zoomed-in to enlarge the visible program's content by displaying a smaller portion of the visible program's content 54 in response to user motion moving the device up towards the user's eyes.

FIG. 4B illustrates device motion in negative Z direction. Device motion in this direction, as indicated by motion arrow 52, results in the screen being zoomed out. In other words, the visible program's content in the scrollable and/or zoomable portions of the display 16, as seen prior to device movement in FIG. 1, is zoomed out to reduce, in size, the visible program's content. In the example provided in FIG. 4B, the entire display content 40 is now displayed in response to user having moved the device away from the user's eyes.

In the preferred embodiment, the device may, in response to user supplied motion of the device, scroll and zoom program content concurrently, whereby the user may easily and intuitively browse the full content of a program.

Due to the limitations of small display screens in portable computing devices, it would benefit the user if the portion of the display screen devoted to displaying scrollable and/or zoomable content of a program could expand to fill a greater portion of the display screen during scrolling and/or zooming, whereby the user could view more of the content being scrolled and/or zoomed. In an aspect of the invention, some non-scrolling and non-zooming screen objects, such as menus, status bars, rulers, ribbons, executable touch screen buttons and other objects, may be moved off, or minimized on, the display screen, in response to device motion and/or user commands to scroll and/or zoom program content. Concurrently, the scrollable and/or zoomable portions of the display will enlarge to fill a greater portion of the screen used for the content, whereby the user can view more of the program's content.

In the preferred embodiment, individual programs may respond to motion of the display screen that exceeds a threshold value to resize portions of the display screen. The non-scrolling and non-zooming screen objects of the device, represented in the example web browsing program, as illustrated in FIG. 1, by an address bar 14 and a control bar 18, may be moved off, or minimized on, a display screen 16 while the device is scrolling and/or zooming content. The scrollable and/or zoomable portions of the display screen may be enlarged to fill a greater portion of the display screen. Also in the preferred embodiment, the resized portions may be un-resized with the non-scrolling and non-zooming screen objects returned to the display screen and the scrollable and/or zoomable portions of the display screen reduced to their pre-resizing size upon the detection of the motion of the display screens within a threshold value. A time interval may occur between the time of detection of the motion of the display screens, within a threshold value, and the time of the un-resizing of the display screen, whereby the user could quickly start and stop motion, and thus scrolling and or zooming, of the device without the non-scrolling and non-zooming screen objects flickering on and off the display screen. The use and programming of time intervals, as well as the means to resize screen objects, is well known.

In another embodiment, the un-resizing of the display screen may only occur in response to motion of the display screen in specific directions. For example, when the motion falls within a threshold value in the positive Z direction, the display screen will be un-resized, but when the motion falls within a threshold value in the negative Z direction, the display screen will be left in the resized state.

In an aspect of the invention, the threshold values, as with all threshold values in this disclosure, and time interval values may be configured by the user globally, or within individual programs, or the values may be hard coded into the device. Default values may be supplied. The means to modify user configurable values is well known.

For certain program content, it would benefit the user to be able to rotationally scroll the display screen of the portable computing device. Rotational scrolling is the modification of displayable screen content to maintain the orientation of the content relative to the user of the device, or a geophysical direction, as the device is rotated in the X, Y plane. For instance, a mapping application may rotationally scroll the display screen in the X, Y plane to maintain a direction, such as North, pointing in its true direction. To detect rotational motion of a display screen, the means to measure device motion and distinguish device rotation from non-rotational motion must be supplied.

In an embodiment, the means to measure device motion and distinguish device rotation from non-rotational motion comprises an accelerometer and a gyroscope.

In an embodiment, the means to measure device motion and distinguish device rotation from non-rotational motion comprises an accelerometer and a compass.

In the preferred embodiment, the means to measure device motion and distinguish device rotation from non-rotational motion comprises a plurality of 3-axis accelerometers that do not occupy the same physical space. A minimum of two separated physically, 3-axis accelerometers are required to distinguish device rotation from non-rotational motion in all directions. Further, a minimum of two, separated physically, accelerometers are required to distinguish in plane device rotation from in axis non-rotational motion.

In the preferred embodiment, individual device programs may decide whether or not to rotationally scroll content of the program in a portion of the display screen.

Figure 5:
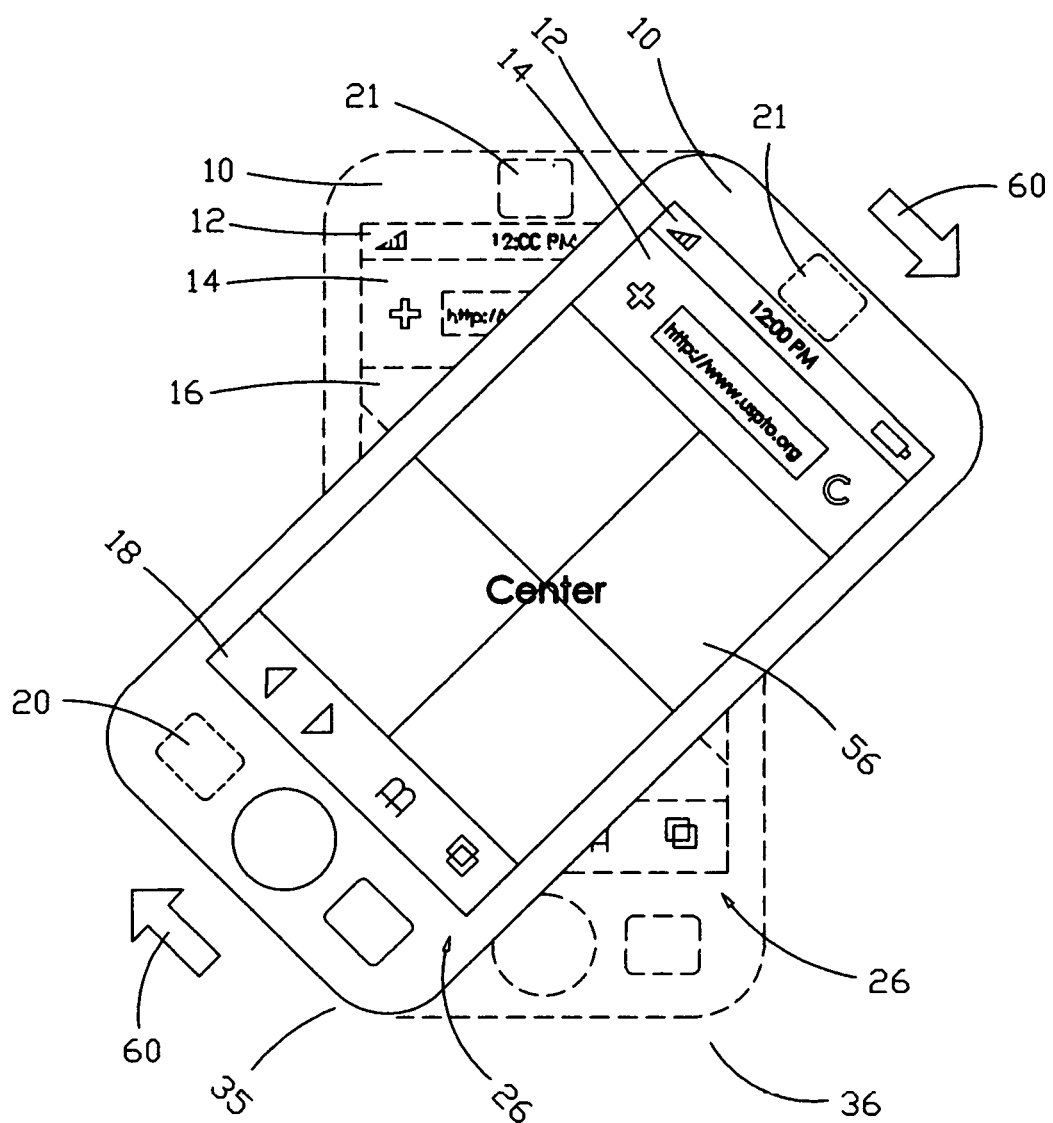
FIG. 5 illustrates the portable computing device with display screen, in accordance with some embodiments, after being rotated clockwise.

FIG. 5 illustrates the device 10, in accordance with one embodiment, with a display screen 26 and a first accelerometer 20 and a second accelerometer 21. A process compares signals from the two accelerometers, determines if the device has been rotated, and determines a rotational scrolling command. The device facilitates rotational scrolling of the scrollable and/or zoomable portions of the display. In the example illustrated in FIG. 5, the user has rotated the device clockwise, as indicated by motion arrows 60, from an initial device position 36 to a new rotated device position 35. In the initial device position, the scrollable and/or zoomable portions of the display 16 would appear to the user as seen in FIG. 1. FIG. 5 shows that the scrollable portion of the visible program's content 56, in the new rotated position, has been rotationally scrolled by an angle approximately equal to the angle the device has been rotated and in the opposite angular direction. The orientation of the content of the scrollable portion of the display appears approximately stationary to the user. To achieve rotational scrolling, portions of the visible program's entire content 40 have been moved onto the display screen 26 and portions have been moved off the display screen.

Portable computing devices are by their nature, not always stationary relative to their immediate surroundings or their user. The user may, at times, not want displayed content to scroll and/or zoom on the display screen in response to device motion. To enable motion based scrolling and/or zooming only when the user desires may be accomplished by a method, implemented by a process, to detect a user command, and to temporarily override the state of motion based scrolling and/or zooming in response to the command. The user command may be issued through any common methods that commands are currently issued such as, but not limited to, pressing a button, pressing and holding a button, and touching a touch screen and/or in combination with device motion that exceeds a threshold value. The threshold value may be a value to be compared to the acceleration, velocity, or displacement of the device. The state of motion based scrolling and/or zooming is either enabled or disabled.

In an embodiment, the computing device, as seen in FIG. 1, has a motion control button 24 that when pressed will be detected by the process as a user command to override the state of motion based scrolling and/or zooming. The motion control button is a dedicated button that enables and/or disables motion based scrolling and/or zooming. The release of the press of the button will end the method.

In another embodiment, the computing device, as seen in FIG. 1, contains another button. The other button, in this example, is a home button 22. The home button will issue a system command if pressed and released. However, the home button may control motion based scrolling and/or zooming if it is pressed and held down while the device is moved beyond a threshold value. While the home button is held down and the device motion has exceeded the threshold value, the state of motion based scrolling and/or zooming will be enabled, if it was previously disabled, and disabled, if it was previously enabled. Upon the release of the button 22, the default processing of device motion will be restored and the command that the button would issue to the device without device motion will be repressed. The home button represents any button on the device that issues other commands when pressed and released without device motion exceeding the threshold value.

In another embodiment, the user may override the state of motion based scrolling and/or zooming by touching the display screen 26, which is a touch screen, and maintaining the touch while moving the portable device 10 with a motion greater than a threshold value. The release of the touch will end the method.

In the preferred embodiment, the user may override the state of motion based scrolling and/or zooming by touching the display screen, which is a touch screen, and maintaining the touch while moving the device with a motion greater than a threshold value, or the user may press the home button.

The embodiments and methods to override the state of motion based scrolling and/or zooming are not mutually exclusive and may be implemented in the device in any combination.

In another embodiment, the button for changing the state of motion based scrolling and/or zooming may be an on-screen button.

In the preferred embodiment, the user may set the default value for motion based scrolling and/or zooming to enable or disable, as described above, for individual programs as well as a system default value. The user may also temporarily override the current default state of motion based scrolling and/or zooming.

In another embodiment, the state of motion based scrolling and/or zooming may be toggled on and off by a common command such as, but not limited to, a device button, an on screen button, a menu item, a finger gesture, or a device motion gesture.

FIGS. 6A, 6B, and 6C, along with the previously discussed FIG. 4A, comprise a sequence of steps that illustrate a method for switching programs, or program content, in a portable computing device. These figures, as with all figures in this disclosure, represent an example of embodiments and methods and use example programs that should not be used to limit the scope of the invention. In FIG. 6A, the device has been moved in the negative Z direction, as indicated by device motion arrow 52. Prior to the device being moved in the negative Z direction, the device was in the state illustrated in FIG. 4A which will be considered the initial, and first, state for the methods about to be disclosed. In response to device motion in the negative Z direction, all methods described herein, zoom out the visible content of the current visible program, which in this example comprises the scrollable and/or zoomable portions of the display 16, the address bar 14, and the control bar 18. As seen in FIGS. 6A, 6B, and 6C, the status bar 12 represents screen content that is controlled by the operating system and does not change in response to user motion. In FIG. 6A, the visible program has been zoomed out to a substantially smaller size than illustrated in FIG. 4A. This allows the device's operating system to display other programs, represented in this illustration by a second program's content 62 and a third program's content 64. Both of these two programs have only a portion of their viewable content displayed on the display screen 26. All three programs discussed so far represent a list, which need not be limited in number, of programs, or program content, the user may switch to.

Three methods exist for arriving at the device state illustrated in FIG. 6A. The device, or individual programs, may implement all methods so the user may choose which method to use, or the device, or individual programs, may implement one or more methods.

The first steps of an exemplary and first method comprise: The user moves the device in the negative Z direction; If the process that implements the method detects that the user has pressed and not released home button 22, which may issue other commands if pressed and released without device motion, the device responds to the stated device motion, from FIG. 4A to 6A, by zooming out the visible content of the current visible program without first zooming out the zoomable portion of the currently visible program's scrollable and/or zoomable content. FIG. 6A represents this method. In the example, represented by FIG. 6A, the user has pressed down home button before moving the device in the negative Z direction. It can be seen by the reader, in FIG. 6A that the word "Center" in the visible program's content 54 of FIG. 4A has remained in the zoomed-in state seen in FIG. 4A. The object of the first steps of the first method is to reduce the distance the device must be moved to reach the device state seen in FIG. 6A, and the amount of time needed to reach this state. The home button is used as an example and represents any button on the device that issues commands when pressed and released without device motion exceeding the threshold value.

In the second method, not illustrated, the device will first zoom out the zoomable portion of the currently visible program's scrollable and/or zoomable content. Second, the device will zoom out the visible content of the current visible program to reach the device state wherein other programs begin to scroll onto the display screen.

In the third method, device motion in the negative Z direction, that exceeds a threshold value, accelerates the zooming out process as pressing and holding down home button 22 accelerates the zooming out process, in the first method.

The three methods follow the same heuristic from the state of FIG. 6A to the conclusion of the method, or heuristic. From the state of FIG. 6A, the device is moved in the positive X direction, as indicated by motion arrow 30, to reach the state illustrated in FIG. 6B. In FIG. 6B, it can be seen that the third program's content 64 has scrolled in the opposite direction of device motion and is now fully visible to the user. The program the user had been interacting with is now partially scrolled off the display screen. To switch to the third program, the user moves the device in the positive Z direction, as indicated by motion arrow 50, to the state illustrated in FIG. 6C. As can be seen in FIG. 6C, the third program now fills the portion of the display screen apportioned for programs with the third program's expanded content 66. The third program now becomes the new current and visible program. The state illustrated in FIG. 6C marks the end of the three methods for switching programs by using device motion.

In an aspect of the invention, the first, and exemplary, method for switching programs by using device motion, the button that the user may hold down to accelerate the zooming out of the current visible program may be a button dedicated to this task.

In another aspect of the invention, a method for switching programs by using device motion may differ from the exemplary method only by using device motion, in the negative Z direction, which exceeds a threshold value to substitute for holding down a button while moving the device in the negative Z direction. All other steps of the preceding method for switching programs remain the same.

The viewable content of programs may be expansive and beyond a user's normal range of motion to scroll the extents of the content through motion based scrolling. To address this deficiency, some embodiments and methods will be disclosed to initiate a command to continuously scroll the scrollable portions of one or more display screens at a set rate. The rate of continuous scrolling is a quantity of scrolling initiated by a signal from a system clock issued at a set sampling rate. The system clock is common and the means to program the clock and set a sampling rate is known in the art.

In the preferred embodiment, methods and heuristics are implemented by a process which first, interprets a sequence of one or more device motions in combination with user initiated button and/or touch screen touch commands, then, secondly, initiates continuous scrolling of the displayable and scrollable contents of the viewable programs, thirdly, the process waits for a user command to stop the continuous scroll or stops upon reaching the limits of displayable and scrollable content.

The method to initiate continuous scrolling comprises: a process requests, from the operating system, signals from the system clock at requested time intervals; the process, upon receiving the signals, generates commands to scroll the scrollable portions of the display screen by a set amount.

The preferred embodiment comprises two methods of detecting a command to initiate continuous scrolling. The two methods comprise: sequences of device motion and user initiated button and/or screen touch commands, and the heuristics to determine commands to initiate the scrolling.

Figures 7A, 7B, 7C:
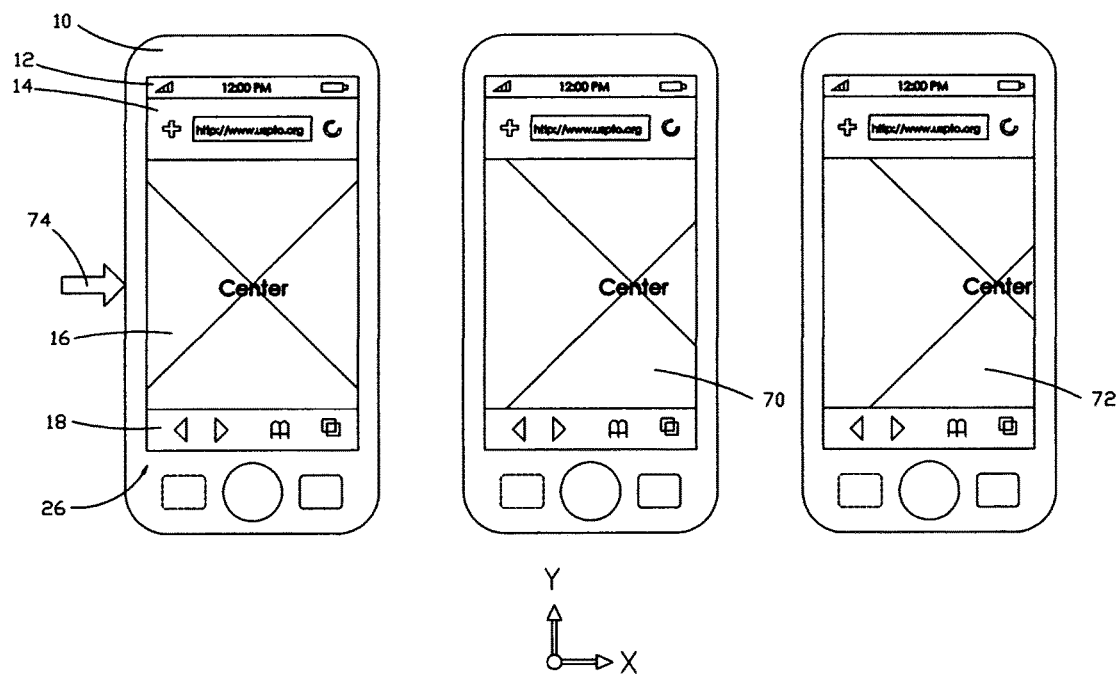
FIG. 7A illustrates a portable computing device with display screen in accordance with some embodiments, while being moved to the right.
FIG. 7B illustrates a portable computing device with display screen in accordance with some embodiments, during continuous scrolling.
FIG. 7C illustrates a portable computing device with display screen in accordance with some embodiments, during continuous scrolling.

The first method to detect a command to initiate continuous scrolling is illustrated in FIG. 7A and comprises: the user presses the home button 22, or presses a dedicated motion control button 24, or touches a touch screen 26, or touches a touch screen button; the user maintains the press or touch; the user moves the device 10 in the direction the user wants the screen to be scrolled, as indicated by motion arrow 74, in this example; the device motion exceeds a threshold value for acceleration and/or velocity, that may be set by the user or hard coded into the device. The press or touch may occur before the device motion, or within a set time interval of the device motion exceeding the threshold value. Upon detection of the sequence by a process, the process will start continuous scrolling. FIGS. 7B and 7C illustrate continuous scrolling. FIG. 7A illustrates the initial state of the scrollable portions of the display screen 16 of the device at the time that continuous scrolling is initiated. In FIG. 7B, the device is stationary, relative to its initial motion values, and shown after several increments of time after continuous scrolling has started. The reader can see that the scrollable portion of the display 70 has scrolled in the direction of previous device motion, and the non-scrollable portions of the display screen 12, 14, and 18 have not scrolled. FIG. 7C illustrates the device in the same state as FIG. 7B, but represents the device after several more increments of time has lapsed. The reader can see that the scrollable portion of the display 72 has scrolled a similar amount more and represents the continuous scrolling function. Continuous scrolling will end when the limits of displayable content of the viewable program have been reached or the process detects that the user has released the press or touch.

The second method to detect a command to initiate continuous scrolling comprises: the user presses the home button 22, or presses a dedicated motion control button 24, or touches a touch screen 26, or touches a touch screen button; the user maintains the press or touch; the user moves the device in the direction the user wants the screen to be scrolled; the device motion exceeds a threshold value for acceleration and/or velocity, that may be set by the user or hard coded into the device; the user releases the press or touch before the device motion is within a threshold value and/or a set release time interval. The press or touch may occur before the device motion or within a set time interval of the device motion exceeding the threshold value. Upon detection of the sequence by a process, the process will start continuous scrolling. Continuous scrolling will end when the limits of displayable content of the viewable program have been reached or the process detects that the user has pressed and released the button or touch screen or touch screen button that initiated the process.

In an aspect of the invention, the direction of continuous scrolling may be in a direction that corresponds to device motion. For example, if the content may only be able to be scrolled in specific directions such as an horizontal direction, along the X axis in FIG. 7A, then only the X axis portion of the motion signals will be used to calculate the scrolling direction. The heuristic for determining the scrolling direction, from the device motion direction, is best left to the individual programs that implement these programs as the content of the programs, and the scroll-ability of the content, vary.

In another embodiment, the direction of continuous scrolling may be in direction that corresponds to an opposing direction of device motion.

At times, the users of a portable computing device may wish to scroll program content one full page at a time. The term "page" in the following discussion does not refer to a full web page but refers to the full amount of content that is currently viewable on the scrollable portions of a display screen. The command to scroll by "one page", which is the equivalent to the common computer commands "page up", "page down", "page right", and "page left", will be referred to herein as a "scroll page command". (Common user interfaces generally do not have keyboard keys for page right and page left, but these commands are implemented in scroll bars.) A sequence of device motions, which could be called a motion gesture, can be detected to provide the user to with a simple, quick, and intuitive method of scrolling content a page at a time.

In the preferred embodiment, methods and heuristics are implemented in the device by a process which first, interprets a sequence of one or more device motions, then, secondly, determines a scroll page command, and, thirdly, executes the command to scroll the displayable and scrollable contents of the viewable programs by one page.

In the exemplary method, the heuristic for determining the scroll page command comprises: first, detecting device acceleration or velocity, in an initial direction, above a threshold value and saving a time at which the method has been started; second, detecting device displacement within a threshold value and within an amount of the time from the start of the method; thirdly, determining the scroll command based on the direction of initial device motion. The heuristic of this method for detecting the motion gesture, detects that the user has quickly moved the device in the initial direction, and then moved the device back to approximately the same position that the device was in when the method started. The two movements of the device need to be completed within a set amount of time for a scroll page command to be executed. As with all scrolling commands described herein, the directions comprise any direction in the plane of the display screen.

In an aspect of the invention, the threshold values for motion and time values may be user configurable or hard coded into the device.

In an aspect of the invention, Motion of the page scroll may correspond to the direction of the initial motion of the device but may not be the same direction. For example, if initial motion is in the positive X direction and the positive Y direction, and if the initial motion in the positive X direction is significantly greater than the motion in the positive Y direction, then a page right command will be executed and the motion in the Y direction will be ignored. Further, motion in the Z axis may be used to determine a page scroll command. However, this direction is not intuitive to the user. Rotational motion may also be used to determine a scroll page command.

In another method to detect a motion gesture to determine a scroll page command, the heuristic for determining the scroll page command comprises: first, detecting angular device acceleration or velocity, in an initial rotational direction, above a threshold value and saving a time at which the method has been started; second, detecting angular device displacement within a threshold value and within an amount of the time from the start of the method; thirdly, determining the scroll command based on the rotational direction of initial device motion.

SUMMARY, RAMIFICATIONS, AND SCOPE

The embodiments and aspects of the invention are disclosed herein to summarize the invention and are not intended to limit the scope of the invention.

The present disclosure generally relates to using the motion of a portable computing device to control the scrolling and/or zooming of display screen content. The disclosed portable computing device allows the user of the device to easily and quickly view the extents of a program's viewable content by moving the device and/or in combination with button or screen presses or touches.

The disclosed portable computing device reduces or eliminates the deficiencies and other problems associated with scrolling and/or zooming user interfaces for portable devices, as listed above. In some embodiments, the device is portable. In some embodiments, the device has one or more display screens, the means to detect motion of the one or more display screens, one or more processors, memory and one or more modules, processes, programs, or sets of instructions stored in the memory for performing multiple functions. In some embodiments, the user scrolls and/or zooms one or more portions of one or more program's content displayed on the one or more display screens through motion of the device. In some embodiments, the amount of scrolling and/or zooming may be calculated from signals from motion detecting means, such as an accelerometer. Instructions for performing these functions may be included in a computer readable storage medium or other computer program product configured for execution by one or more processors. Instructions for performing these functions may apply one or more methods and heuristics to the motion to determine a command for the device, and instructions for processing the command.

The disclosed embodiments, methods, and heuristics allow computing devices with motion derived scrolling and zooming to behave in a manner desired by the user. Accordingly, the reader will see that motion based scrolling and/or zooming is the preferred method for viewing all of a program's content.

The disclosure of the present invention as well as references to the preferred embodiment and other embodiments, are not for limiting the scope of the invention. Persons having ordinary skill in the art may make various modifications and changes without departing from the scope and spirit of the invention. Therefore, the scope of the appended claims should not be limited to the description of the embodiments described above.

I claim:

1. A computing device, comprising:
   a display screen for displaying content of a visible program;
   means for generating one or more acceleration signals;
   memory for storing one or more programs;
   one or more processors for executing the one or more programs stored in said memory, wherein the execution of the one or more programs cause the one or more processors to:
   sample the one or more acceleration signals at a sample rate;
   determine one or more time intervals between one or more current acceleration signals sampled and one or more last acceleration signals sampled;
   establish one or more initial linear motion values, where the one or more initial linear motion values include an initial velocity value;
   calculate one or more current linear motion values from at least one of the acceleration signals and one of the time intervals and a last velocity value, where the current linear motion values include a current velocity value;
   determine one or more last linear motion values from the current linear motion values, where the one or more last linear motion values include a last velocity value;
   determine a screen scrolling displacement value based on at least one of the current linear motion values;
   change a view of the content displayed on the display screen based on the screen scrolling displacement value.

2. The computing device of claim 1, wherein the device further comprises an accelerometer and a gyroscope; and a plurality of instructions to distinguish linear motion from rotational motion based on a plurality of signals outputted from the accelerometer and the gyroscope.

3. The computing device of claim 1, wherein changing the view comprises scrolling and zooming the content concurrently.

4. The computing device of claim 1, wherein changing the view comprises zooming.

5. The computing device of claim 1, wherein the acceleration signals comprise one or more acceleration values in the direction of one or more axes; and the one or more programs further cause the one or more processors to:
   determine one or more velocities from the detected linear motion and the time interval and the last motion values; and
   change the view of the content corresponding to the one or more determined velocities.

6. The computing device of claim 4, wherein the one or more programs further cause the one or more processors to:
   zoom-in the content displayed in response to detecting motion substantially perpendicular to and up from a surface of the display screen, and
   zoom-out the content displayed in response to defecting motion substantially perpendicular to and down from the surface of the display screen.

7. The computing device of claim 1, wherein changing the view comprises scrolling.

8. The computing device of claim 7, further comprising a virtual screen and a display buffer capable of buffering more content than can be displayed within the display screen;
   the one or more programs further cause the one or more processors to control the content written to the display screen from the buffer based at least on one of the current linear motion values, thereby enabling a user to interact with more content than can be displayed within the display screen.

9. The computing device of claim 1, wherein the one or more programs further cause the one or more processors to:
   detect a current linear motion of the display screen that exceeds a threshold value; and
   resize one or more non-scrolling and non-zooming screen objects of the display screen in response to the detected current linear motion of the display screen that exceeds the threshold value, thereby enabling a user to view more of the content during at least one of a scrolling operation and a zooming operation.

10. The computing device of claim 7, wherein the scrolling is smooth, such that the content entering and leaving the display screen are not distinct blocks of content.

11. The computing device of claim 7, wherein the one or more programs further cause the one or more processors to scroll the content by a scrolling displacement greater than the determined displacement of the display screen.

12. The computing device of claim 11, wherein a ratio of the scrolling displacement to the determined displacement of the display screen is scalable based upon one or more determined velocities; whereby a linear motion of the display screen needed to view the entire content is reduced.

13. The computing device of claim 11, wherein a ratio of the scrolling displacement to the determined displacement of the display screen is scalable based upon the determined displacement of the display screen; whereby a linear motion of the display screen needed to view the entire content is reduced.

14. The computing device of claim 1, wherein the computing device emits at least one of an auditory warning and tactile warning when the change in the view has reached a limit.

15. The computing device of claim 1, wherein the one or more programs further cause the one or more processors to detect rotational motion of the display screen; and
   rotationally scroll one or more portions of the display screen in response to the detecting of the rotational motion, wherein the rotational motion is motion in the plane of the display screen.

16. The computing device of claim 15, wherein rotationally scrolling the portions of the display screen rotationally scrolls the content in an opposite rotational direction of the detected rotational motion.

17. The computing device of claim 1, wherein the one or more programs further cause the one or more processors to temporarily override a current state of at least one of motion based scrolling and zooming in response to the device detecting a user input command for the device.

18. The computing device of claim 1, wherein the one or more programs further cause the one or more processors to reset some initial motion values comprising at least one of velocity values and displacement values upon the device detecting a user input command for the device.

19. The computing device of claim 1, wherein the one or more programs further cause the one or more processors to:
   display a list of a plurality of programs or a plurality of program contents upon the device detecting a first user command; and
   scroll the list corresponding to the determined screen scrolling displacement value; and
   select a new current visible program or program content upon the device detecting a second user input command.

20. The computing device of claim 1, wherein the one or more programs further cause the one or more processors to:
   detect a user input command comprising at least one of a button press of the device and a button release of the device and a touch of a touch screen display of the device and a releasing the touch of the touch screen display of the device;
   detect linear motion that has exceeded a first threshold value;
   determine a command for the device upon detecting the threshold value has been exceeded in combination with the detecting of the user input command; and
   processing the command; wherein the command for the device comprising continuously scrolling the content in a direction corresponding to a detected device motion, whereby some previously off-screen content is scrolled onto the display screen at a set rate.

* * * * *